United States Patent
Yu

(10) Patent No.: US 10,038,862 B2
(45) Date of Patent: Jul. 31, 2018

(54) METHODS AND APPARATUS FOR AUTOMATED NOISE AND TEXTURE OPTIMIZATION OF DIGITAL IMAGE SENSORS

(71) Applicant: QUALCOMM Incorporated, San Diego, CA (US)

(72) Inventor: Sang Cheol Yu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/268,391

(22) Filed: Sep. 16, 2016

(65) Prior Publication Data
US 2017/0318240 A1    Nov. 2, 2017

Related U.S. Application Data

(60) Provisional application No. 62/330,703, filed on May 2, 2016.

(51) Int. Cl.
| | |
|---|---|
| H04N 5/228 | (2006.01) |
| H04N 5/357 | (2011.01) |
| H04N 9/04 | (2006.01) |
| H04N 17/00 | (2006.01) |
| G06K 9/62 | (2006.01) |
| G06K 9/46 | (2006.01) |

(Continued)

(52) U.S. Cl.
CPC .......... *H04N 5/357* (2013.01); *G06K 9/4652* (2013.01); *G06K 9/4661* (2013.01); *G06K 9/52* (2013.01); *G06K 9/6215* (2013.01); *G06T 5/00* (2013.01); *H04N 9/04* (2013.01); *H04N 17/002* (2013.01); *G06T 2207/20182* (2013.01)

(58) Field of Classification Search
CPC .. H04N 5/243; H04N 5/2352; H04N 5/23229; H04N 5/217; H04N 5/357; H04N 3/1568; H04N 1/409; H04N 1/58; G06T 5/002; G06K 9/40
See application file for complete search history.

(56) References Cited

U.S. PATENT DOCUMENTS

| | | |
|---|---|---|
| 7,889,943 B1 | 2/2011 | Christian |
| 2009/0190853 A1 | 7/2009 | Noh |
| 2010/0128147 A1 | 5/2010 | Chang et al. |

(Continued)

OTHER PUBLICATIONS

Fattal R., et al., "Multiscale Shape and Detail Enhancement from Multi-light Image Collections," ACM Transactions on Graphics, Jul. 29, 2007 (Jul. 29, 2007), vol. 26(3), pp. 51, XP055011081.

(Continued)

*Primary Examiner* — Kelly L Jerabek
(74) *Attorney, Agent, or Firm* — Knobbe, Martens, Olson & Bear, LLP

(57) ABSTRACT

Systems and methods are disclosed for calibrating an image sensor using a source image taken from the image sensor and comparing it to a reference image. In one embodiment, the method may involve determining the luminance and chrominance values of portions of the image at successive frequency levels and calculating a standard deviation at each frequency level for both the source image and the reference image. The standard deviation values may be compared and a difference determined. Using unit vector search vectors, noise values may be calculated to determine sensor calibration values.

29 Claims, 10 Drawing Sheets

(51) Int. Cl.
*G06T 5/00* (2006.01)
*G06K 9/52* (2006.01)

(56) References Cited

U.S. PATENT DOCUMENTS

| | | | |
|---|---|---|---|
| 2010/0150465 A1* | 6/2010 | Lee | G06T 5/002 382/260 |
| 2011/0182510 A1* | 7/2011 | Hong | G06T 3/4015 382/167 |
| 2012/0169936 A1* | 7/2012 | Persson | H04N 5/21 348/609 |
| 2013/0064448 A1 | 3/2013 | Tomaselli et al. | |
| 2013/0322752 A1* | 12/2013 | Lim | G06T 5/20 382/167 |
| 2013/0329004 A1 | 12/2013 | Baqai et al. | |
| 2014/0079336 A1 | 3/2014 | Venkataraman et al. | |
| 2014/0240555 A1* | 8/2014 | Fainstain | H04N 5/217 348/241 |
| 2017/0061234 A1* | 3/2017 | Lim | G06K 9/4661 |

OTHER PUBLICATIONS

Xiao C., et al., "Adaptive Bilateral Filtering and Its Application in Retinex Image Enhancement," 2013 Seventh International Conference on Image and Graphics, IEEE, Jul. 26, 2013 (Jul. 26, 2013), pp. 45-49, XP032515466.

International Search Report and Written Opinion—PCT/US2017/018872—ISA/EPO—dated May 2, 2017.

Sunkavalli K., et al., "Multi-scale image harmonization," ACM Transactions on Graphics (TOG), ACM, us. Jul. 26, 2010 (Jul. 26, 2010), vol. 29(4), pp. 1-10, XP058157865.

Zhang M., et al., "Multiresolution Bilateral Filtering for Image Denoising," IEEE Transactions on Image Processing , IEEE Service Center, Piscataway, NJ, US, Dec. 2008, vol. 17(12), pp. 2324-2333, XP011248764.

\* cited by examiner

FIG. 4

METHODS AND APPARATUS FOR AUTOMATED NOISE AND TEXTURE OPTIMIZATION OF DIGITAL IMAGE SENSORS

CLAIM OF PRIORITY UNDER 35 U.S.C. § 119

The present application for patent claims priority to Provisional Application No. 62/330,703 entitled "METHODS AND APPARATUS FOR AUTOMATED NOISE AND TEXTURE OPTIMIZATION OF DIGITAL IMAGE SENSORS" filed May 2, 2016, and assigned to the assignee hereof. Provisional Application No. 62/330,703 is hereby expressly incorporated by reference herein.

TECHNICAL FIELD

The present application relates to noise and texture tuning in digital image sensors, and more specifically to determining quantitative metrics based on image data.

BACKGROUND

Noise and texture tuning in digital image sensors is required to correctly calibrate the multitude of parameters that control chrominance and luminance noise frequencies. There are different sources of noise in digital images acquired by image sensors in digital cameras, camcorders, and scanners, including fixed-pattern noise and temporal noise. Many factors determine the overall noise characteristics in an image: sensor type, pixel dimensions, temperature, exposure time, etc. Noise can also vary within an individual image. For digital cameras, darker regions may contain more noise than the brighter regions. Moreover, noise is space varying and channel dependent. The blue channel is often the noisiest channel. Classical noise-reduction techniques remove noise from the Bayer image, before the color interpolation step. Thus, classical noise reduction techniques assume the noise to be uncorrelated for different pixels.

The amount of noise which is not removed by the noise reduction technique is often spread in a neighborhood by the color-interpolation algorithm, which infers missing color components. Consequently, noise may have low-frequency (coarse-grain) and high-frequency (fine-grain) variations. High-frequency noise is relatively easier to remove than low-frequency noise, which may be difficult to distinguish from the real image signal. Moreover, noise is composed of two elements: fluctuations in color and luminance. Color or "chroma" noise is usually more unnatural in appearance than luminance noise, and can render images unusable if the image sensor is incorrectly calibrated. This kind of noise may appear as low-frequency, colored blobs in regions of low spatial frequency. These colored blobs may be irregularly shaped and are typically around 5 to 25, or more, pixels wide in a given direction, and usually are more pronounced in darker regions than in brighter regions.

Existing approaches for noise and texture tuning in digital cameras and devices that include digital cameras (e.g., mobile phones), typically involve considering more than hundreds of parameters, as well as manual tuning methods. Manual tuning methods may be time-consuming and based on subjective evaluation by human operators.

SUMMARY

A summary of sample aspects of the disclosure follows. For convenience, one or more aspects of the disclosure may be referred to herein simply as "some aspects."

Provided is an image processing method and apparatus for reducing noise in an image and calibrating an image sensor, and a computer-readable storage medium having stored thereon a program executable by a processor for performing the method. Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly.

In one example, there is provided a method for tuning a noise level and a texture level of a given image produced by an image sensor, the method comprising, determining a first set of frequency levels of the image produced by the image sensor using a set of low pass filters, the set of low pass filters comprising at least one bilateral filter, determining a first set of chrominance noise values and luminance noise values corresponding to each frequency level of the first set of frequency levels, calculating a target set of noise values associated with each frequency level of the first set of frequency levels, the target set of noise values calculated based on comparing the first set of chrominance and luminance noise values to a second set of chrominance and luminance noise values of a reference image, determining a first set of noise values associated with the image produced by the image sensor using a coarse search, the coarse search based on an initial set of vectors, wherein each noise value of the first set of noise values corresponds to a frequency level of the first set of frequency levels, determining a second set of noise values associated with the image produced by the image sensor using a fine search, the fine search comprising another set of vectors, wherein the other set of vectors are determined based on a noise value difference between the target set of noise values and the first set of noise values, wherein each noise value of the second set of noise values corresponds to a frequency level of the first set of frequency levels, and updating a coefficient of the at least one bilateral low pass filter based on a difference between the second set of noise values and the first set of noise values, updating a noise reduction block of the image sensor using the coefficient of the at least one bilateral low pass filter, wherein the noise reduction block adjusts a noise level of each pixel of the image sensor individually according to the target set of noise values, and storing the first set and the second set of noise values In some aspects, updating the at least one bilateral low pass filter is continued until the difference between the second set of noise values and the first set of noise values is within a matching range. In some aspects, the matching range is different for each frequency level and the first set of vectors and the second set of vectors each comprise a four-dimensional vector for each frequency level, and the four-dimensional vector comprises four constants, and wherein each constant is a positive integer. In some aspects, the image and the reference image are captured at the same distance from a color calibration target, the color calibration target comprising an arrangement of colored regions.

In some aspects, the coarse search comprises an algorithm:

$$\sum_{l=1}^{m} \frac{1}{n}\sum_{k=0}^{n} \sigma_{target,k,l} - \sum_{l=0}^{m} \frac{1}{n}\sum_{k=0}^{n} \sigma_{source,k,l,p} = 0$$

Where:
n: a total number of colored regions in the color calibration target;
m: a total number of frequency levels;
l: a subject frequency level;
k: a subject colored region;
p: the four-dimensional vector values.

In some aspects, the fine search comprises an algorithm:

$$MSE\left(\frac{1}{n}\sum_{k=0}^{n}\sigma_{target,k,l} - \frac{1}{n}\sum_{k=0}^{n}\sigma_{source,k,pl}\right)$$

Where:
MSE: Mean Square Error.

BRIEF DESCRIPTION OF THE DRAWINGS

FIG. 4 illustrates an example color calibration chart with sampling regions in each color square.

DETAILED DESCRIPTION

The following detailed description includes certain illustrative embodiments of the subject matter. However, the disclosed subject matter can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein Disclosed herein are automatic noise and texture optimization of image sensor.

The examples, systems, and methods described herein are described with respect to techniques for calibrating image sensors (e.g., for noise and texture). The systems and methods described herein may be implemented on a variety of platforms and operating systems.

Quantitative Metrics for Noise and Texture

Figure 1:
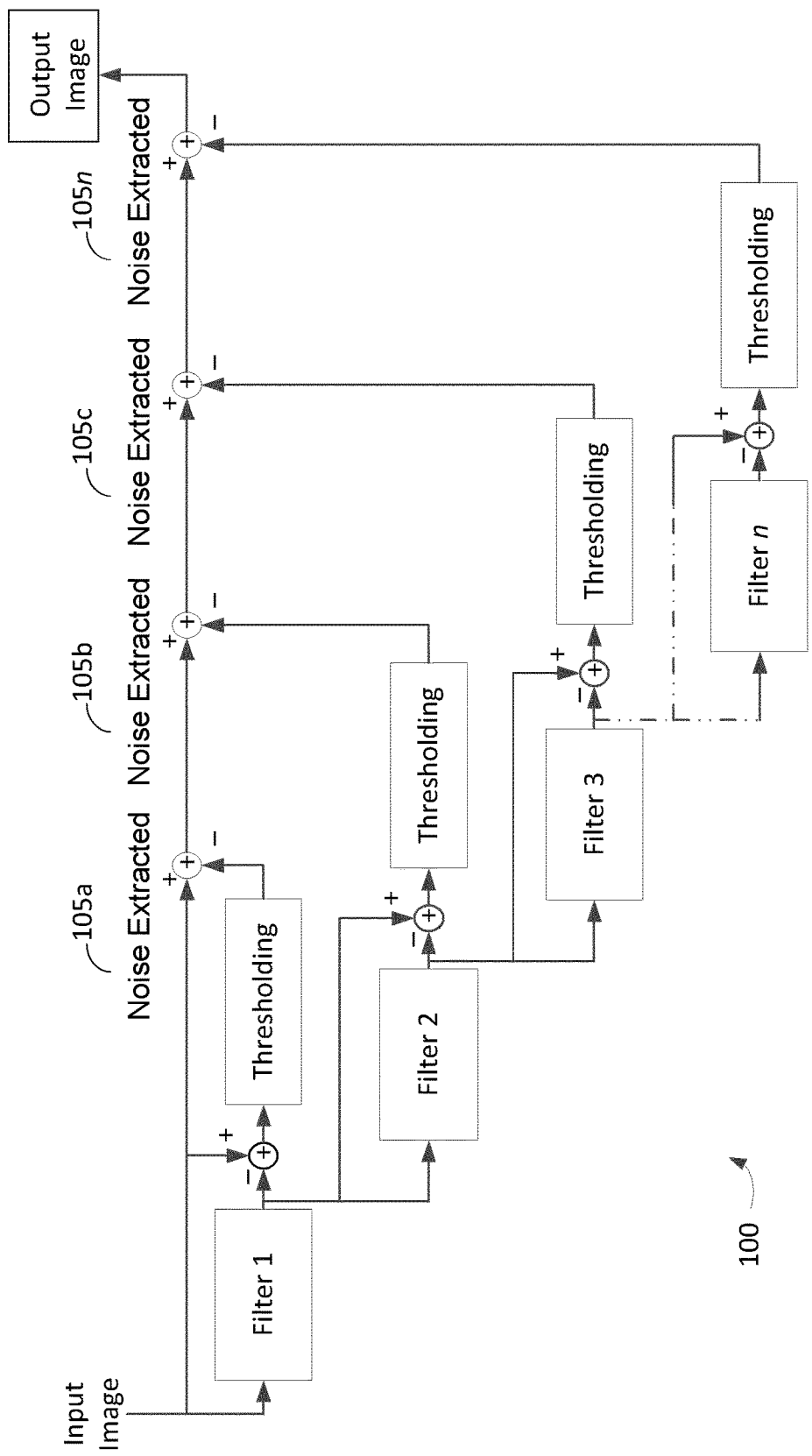
FIG. 1 illustrates a series of filters for extracting levels of noise from an input image at each frequency level.

This following solution involves performing automatic noise and texture optimization by using Wavelet decomposition high frequency component sigma (standard deviation) and a specialized search engine for Wavelet denoise. In one embodiment, the noise and texture of an image may be quantified by calculating different levels of frequency in an image, and determining the luminance (or "luma") and chrominance (or "chroma") noise values for each level of frequency in the image. FIGS. 1 and 3 illustrate examples of how the high frequency component sigma can be extracted from an image. The image may be captured using an image sensor before the sensor has been calibrated to adjust for noise levels of images the sensor produces. The image may be of a Macbeth ColorChecker chart 400, or any other color calibration medium containing spectral reflectance's. Using a calibrated sensor to capture an image of the Macbeth ColorChecker chart 400 may yield a reference image that may provide a target noise level. For example, the levels of frequency of the uncalibrated image may be determined by using each level produced by high frequency components as determined by a Wavelet decomposition process.

FIG. 1 illustrates a method for extracting 100 a noise value 105a-105n for each frequency level using a set of low pass filters, where level 1 is a highest frequency level, and level n is the lowest frequency level. In some embodiments, level n may be a sixth frequency level. Filters 1 through filter n present a method of wavelet decomposition, where the output of filter 1 is the input of filter 2, and so on. The output of filter 1 may be summed with the input image, resulting in noise and edge values at the first frequency level. The output of filter one may also be summed with the output of filter 2 in order to generate the noise and edge values at the second frequency level. In the same way, noise and edge values at each frequency level may be determined for a thresholding stage. The method for extracting 100 a noise value 105a-105n may be applied to the image as a whole in an RGB state, or it may be applied to each of the Y, Cb, and Cr components individually.

Figure 2:
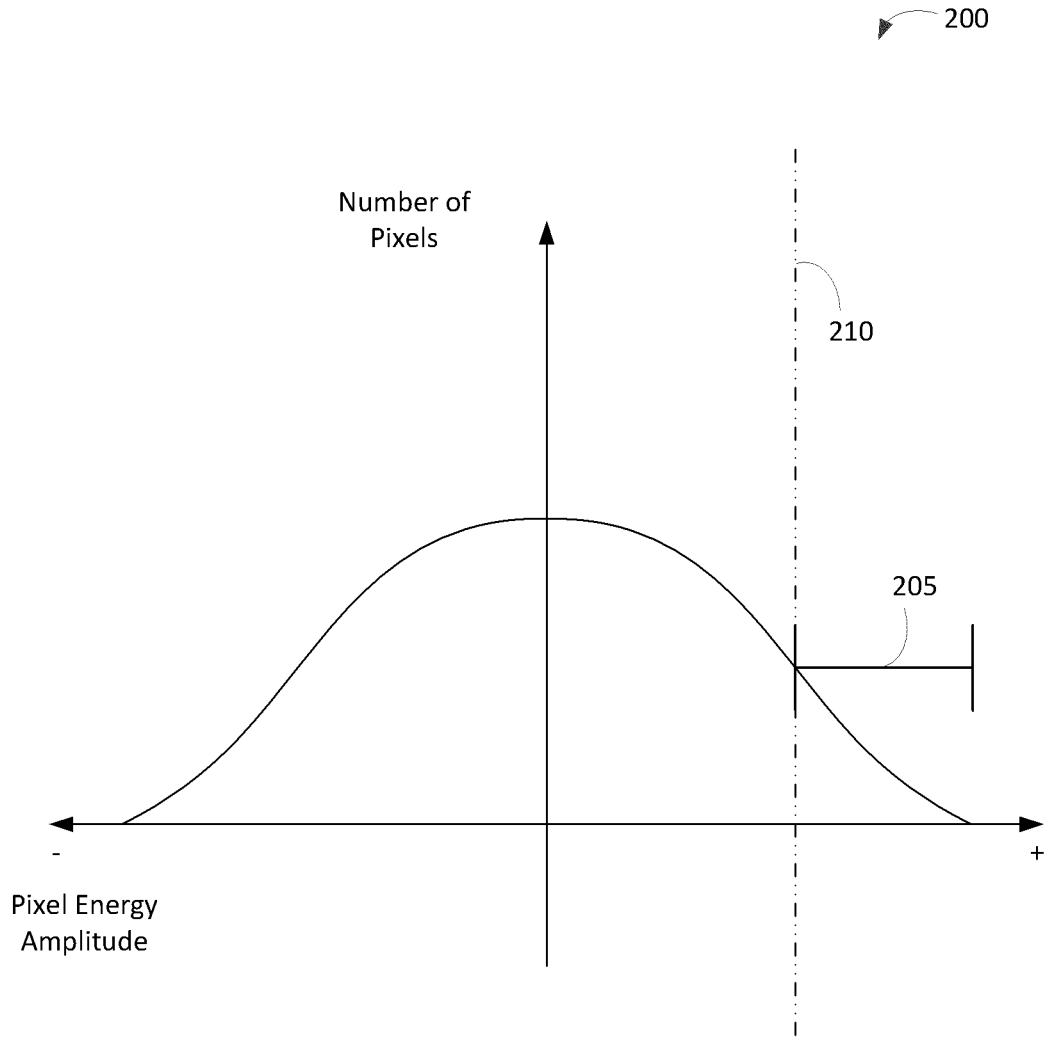
FIG. 2 illustrates an example of a region of high amplitude noise that is removed from the input image.

Still referring to FIG. 1, the thresholding blocks may remove a high amplitude area of pixel energy. This is done because the high amplitude region represents an edge, while the low amplitude region represents noise. The determination of the high amplitude area may be user configurable. FIG. 2 illustrates an example of amplitude removal 200. The y-axis of the Cartesian coordinate system represents a number of pixels, while the x-axis represent the amplitude of pixel energy. A threshold amplitude value 210 may be set in order to determine the portion of amplitude removed 205. The threshold amplitude value 210 may be user configurable or may be determined as a value that is normalized to a percentage based on the energy of the of the image sensor. For example, the threshold value may be set to a value that corresponds to a percentage of the average energy in the pixels of the sensor.

Still referring to FIG. 1, a first noise value 105a, or first noise extracted, may be calculated by subtracting the low amplitude signal that is output from the thresholding stage, from the input image. This first noise value 105a may correspond to the first frequency level. Similarly, the low amplitude signal that is output from the thresholding stages following filters 2 through n may be subtracted from the input image to generate the noise value 105b-105n for each corresponding frequency level 2 through n. The noise values 105a-105n are summed to generate the output image.

Figure 3A:
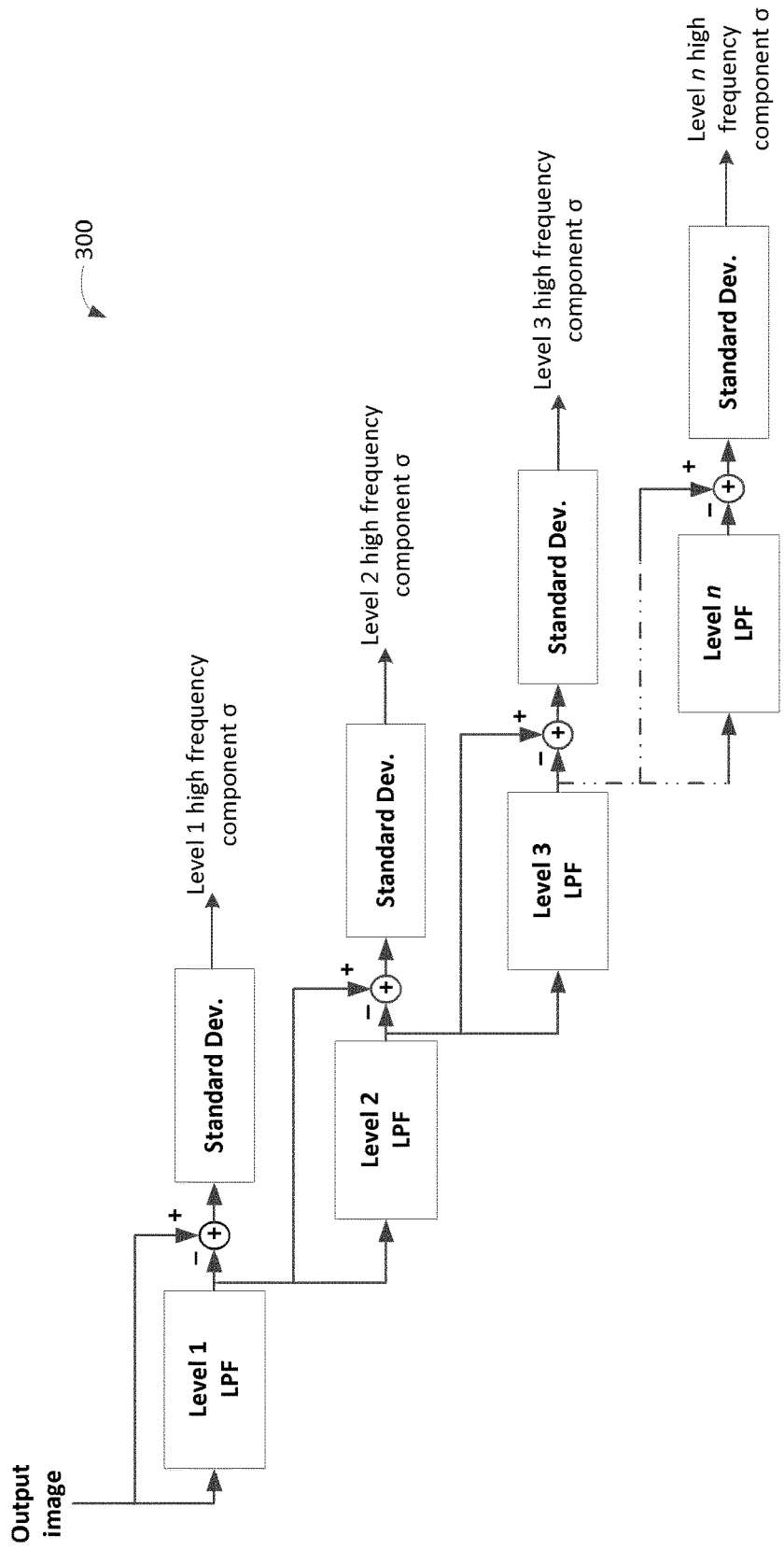
FIG. 3A illustrates a series of low pass filters for determining a high frequency component at each frequency level.

FIG. 3A illustrates in further detail how the standard deviation (high frequency component, "sigma") may be determined 300 using the output image of FIG. 1. A series of low pass filters may be used to generate a high frequency component (σ) at each frequency level. For example, the level 1 low pass filter may pass a range of frequencies from the output image that are lower than a threshold value. The low frequency values that are passed from the level 1 low pass filter may be subtracted from the output image, and a standard deviation may be calculated for the remaining values. The standard deviation values may be the average of each pixel in a region of interest. The region of interest may be a region of a color square in a MacBeth ColorChecker chart 400. The standard deviation values may also be referred to as the high frequency component for a particular frequency level. The standard deviation values may be determined for each of the Y, Cb, and Cr components of the image output by the method for extracting 100 a noise value 105a-105n in FIG. 1.

Figure 3B:
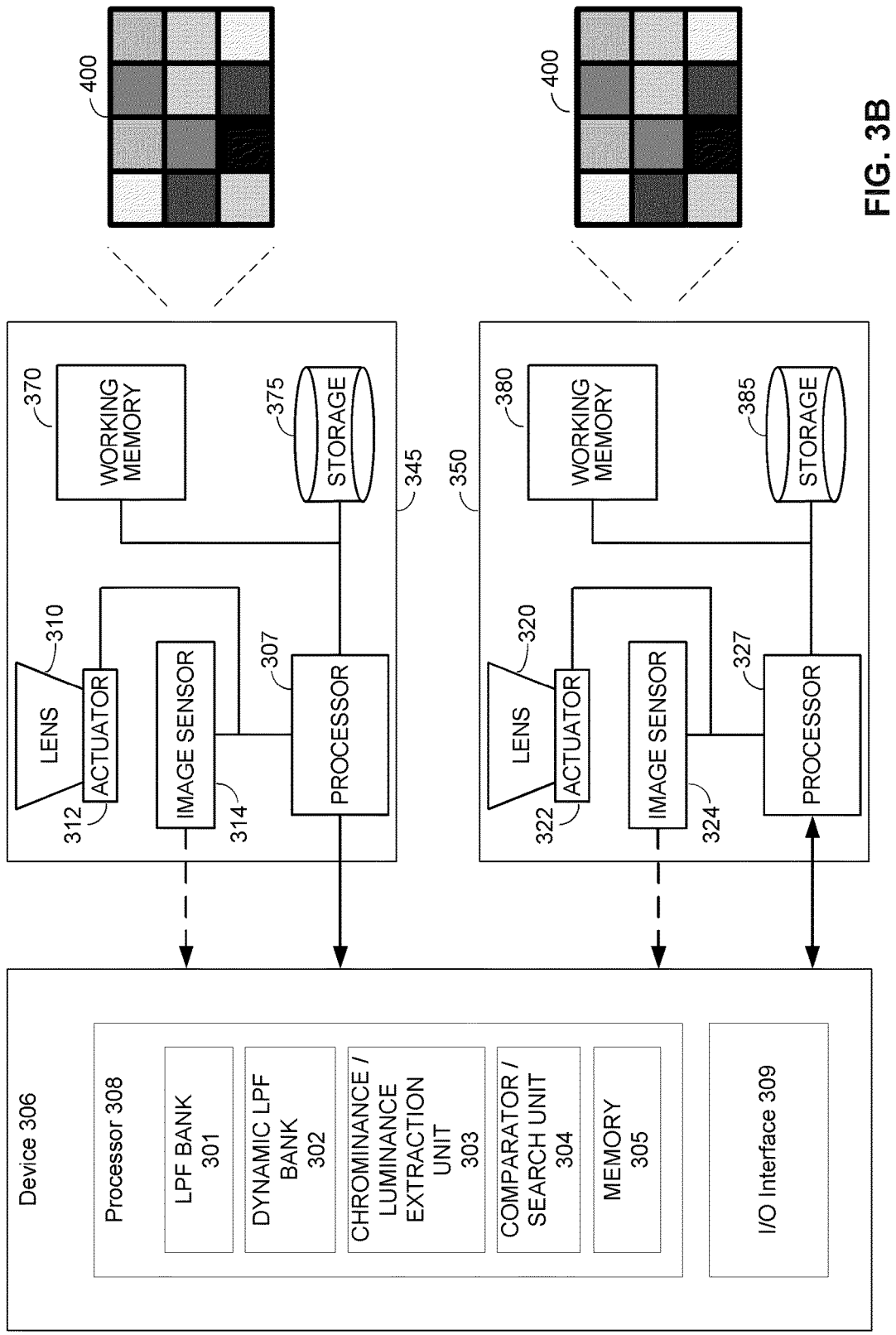
FIG. 3B illustrates an example block diagram of a system for comparing an image captured by an uncalibrated sensor with a reference image captured by a calibrated sensor, and updating the image signal processor.

FIG. 3B illustrates a calibrated camera 345 capturing an image of a ColorChecker chart 400, the captured image being a reference image. Also illustrated is an uncalibrated camera 350 capturing an image of a ColorChecker chart 400, the captured image being a source image of the uncalibrated image sensor 324. The calibrated camera 345 may include a lens 310. The lens 310 of a camera 345 captures the light from the subject and brings it to a focus on the image sensor. In general terms, the two main optical parameters of a photographic lens are maximum aperture and focal length. The focal length determines the angle of view, and the size of the image relative to that of the object (subject) for a given distance to the subject (subject-distance). The focal length may be adjusted using an actuator 312. The actuator 312 may be adjusted by the processor 307 based on an auto-focus algorithm such as a contrast auto-focus, or a manual focus. The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera. The actuator 312 may also adjust the aperture of the lens 310 using an auto focus algorithm or a manual setting. The calibrated camera may also include a working memory 370 for storing image capturing algorithms such as auto-focus algorithms. A second storage 375 may also be included for storing images captured by the camera, or for storing calibration parameters. The processor 307 coupled to the calibrated image sensor 314 may communicate processed image data to device 306. In an optional embodiment, the calibrated image sensor 314 may communicate unprocessed image data from the image sensor 324 to the device 306.

Still referring to FIG. 3B, the uncalibrated camera 350 may also include a lens 320. It is noted that the arrangement of FIG. 3B is for illustrative purposes, and that one skilled in the art would understand that both cameras 345, 350 are not necessarily required. For example, the calibrated image sensor 314 and the uncalibrated sensor 324 may share the same camera housing. For example, a single camera including the lens, actuator, processor, working memory, and second storage may be used for both the uncalibrated image sensor 324 and the calibrated image sensor 314. In another embodiment, two different camera system may be used to calibrate the image sensor, each camera capturing an image of the same ColorChecker chart 400. In such an example, the lens 320 of the uncalibrated camera 350 captures the light from the subject and brings it to a focus on the image sensor. The focal length may be adjusted using an actuator 322. The actuator 322 may be adjusted by the image sensor processor 327 based on an auto-focus algorithm such as a contrast auto-focus, or a manual focus. The actuator 322 may also adjust the aperture of the lens 320 using an auto focus algorithm or a manual setting. The calibrated camera may also include a working memory 380 for storing image capturing algorithms such as auto-focus algorithms. A second storage 385 may also be included for storing images captured by the camera, or for storing calibration parameters. The image sensor processor 327 coupled to the uncalibrated image sensor 324 may communicate processed image data to the device 306. In an optional embodiment, the uncalibrated image sensor 324 may communicate unprocessed image data to the device 306.

Still referring to FIG. 3B, the device 306 may transmit data to, and receive data from, the uncalibrated camera 350. For example, the image sensor processor 327 of the uncalibrated sensor may send image data to the device 306 for evaluation of the data with respect to data received from a calibrated image sensor. The intermediary processor 308 of the device 306 may then execute a program that modifies or modulates the noise reduction block of the uncalibrated image sensor 324 or the image sensor processor 327, or both. The intermediary processor may receive unprocessed or processed image data from the calibrated camera. This image data may be used as reference image data. The reference image data may be passed through a series of low pass filters in a low pass filter bank 301. The low pass filter bank 301 may be used to extract different noise components from the reference image data using the technique illustrated in FIG. 1. The reference image data may also be passed through a series of dynamic low pass filters, the dynamic low pass filters being part of a dynamic low pass filter bank 302. The intermediary processor may determine the low pass filter coefficient of each of the dynamic low pass filters. In another embodiment, the low pass filter coefficient may be user configurable. The dynamic low pass filter bank 302 may be used to extract different noise components from the reference image data using the technique illustrated in FIG. 2. The intermediary processor 306 may also include a chrominance/luminance extraction unit 303 for extracting the chrominance and luminance components from each of the frequency levels derived from the techniques illustrated in FIG. 1 and FIG. 3A. The chrominance/luminance extraction unit 303 may separate the chrominance and luminance components from each frequency level of the received image data, and store the components in the memory 305. The intermediary processor 306 may also include a comparator/search unit 304 for comparing the luminance and chrominance components of image data received from an uncalibrated image sensor 324 with image data received from a calibrated image sensor 314. The comparator/search unit 304 may also determine the search vectors for the coarse search and the fine search, discussed below. The intermediary processor 306 may also include a memory 305 for storing data received and generated by the intermediary processor 306.

Still referring to FIG. 3B, the cameras 345, 350 may connect to the intermediary processor 306 using an I/O interface 309. In some embodiments, the I/O interface 309 of the cameras 345, 350 may be configured to allow the connection of each camera to one or more external devices, such as a computer, a video monitor, or the intermediary processor 306. For example, the I/O interface 309 may include a USB connector, an HDMI connector, or the like. In some embodiments, the I/O interface 309 may be configured to transfer information between the cameras 345, 350 and the connected external device. In some embodiments, the I/O interface 309 may be configured to transfer information wirelessly (for example via infrared or Wi-Fi). In some embodiments, the intermediary processor 306 described above may be configured to control one or more aspects of the camera, including settings associated with the actuator, image sensor, processor, and working memory, navigating the options and menus of the camera, viewing and/or modifying captured images, or rendering a refocused image on a tilted image plane after capturing an image.

Figure 4:
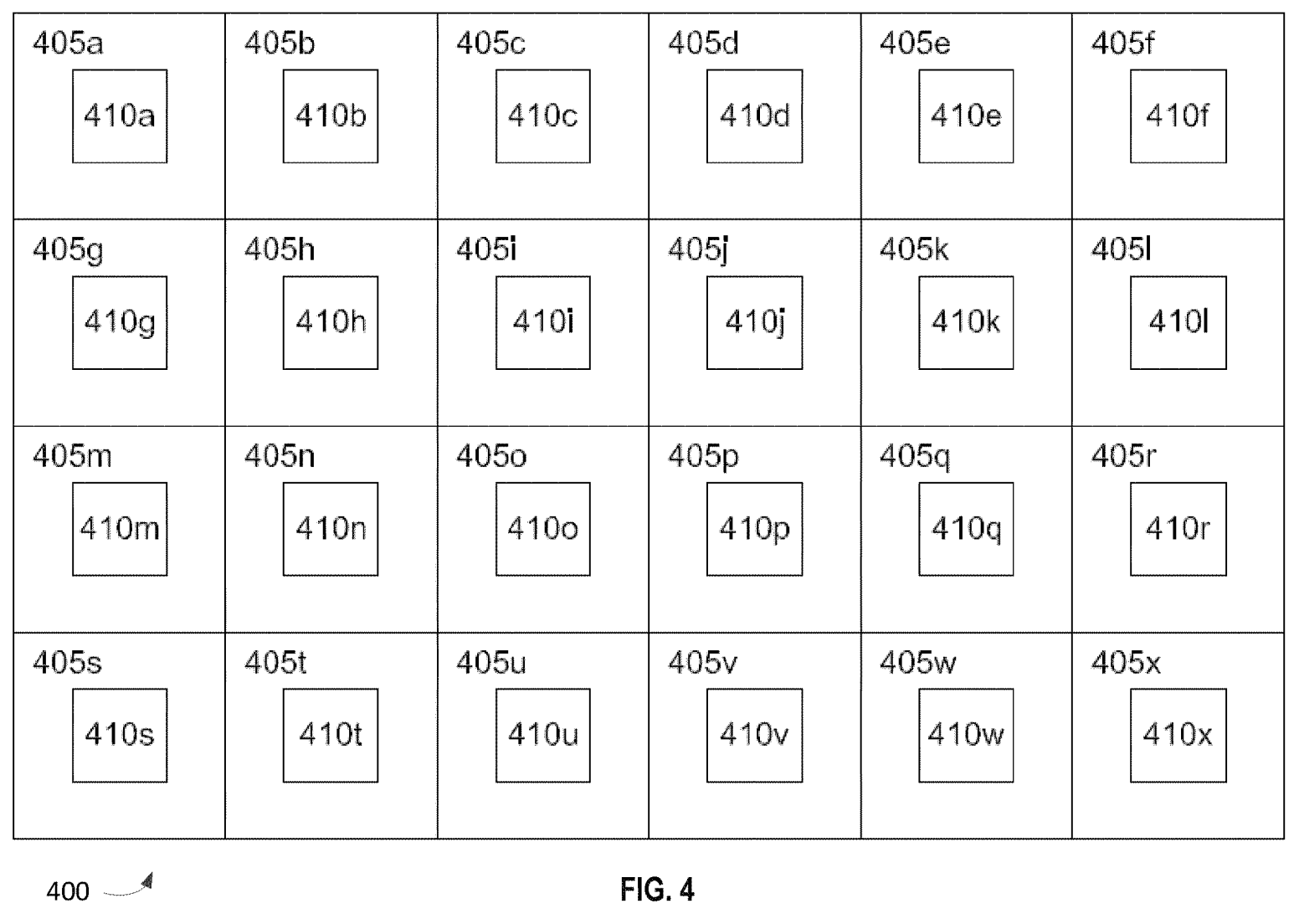

FIG. 4 illustrates a Macbeth ColorChecker chart 400 that may be used as a reference image or an input image for determining a target high frequency component value. The wavelet high frequency components of the source image may be measured or estimated based on the reference Macbeth ColorChecker chart 400 image. A pre-tuned adaptive sharpening filter (ASF) may also be used to determine the high frequency components. The output of the AIO module includes, but is not limited to, how much noise, and the character of the noise in the source image (noise_profile), the LPF characteristics of the wavlet decomposition (edge_softness), and the tuning parameters for removing the noise (denoise_scale). Denoise_weight is an additional parameter that may be used during optimization.

Still referring to FIG. 4, each square (405a-405x) of the Macbeth ColorChecker chart 400 may be of a different color. The reference image and the source image may be of the same chart for frequency noise comparison purposes. The source image may include regions for sampling (410a-410x) the noise levels.

Figure 5:
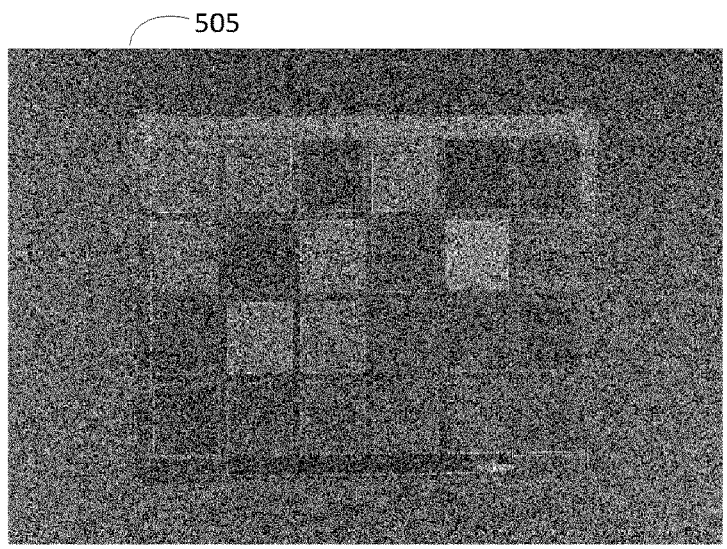
FIG. 5 illustrates the results of wavelet decomposition of an input figure at three different frequency levels.
Figure 5:
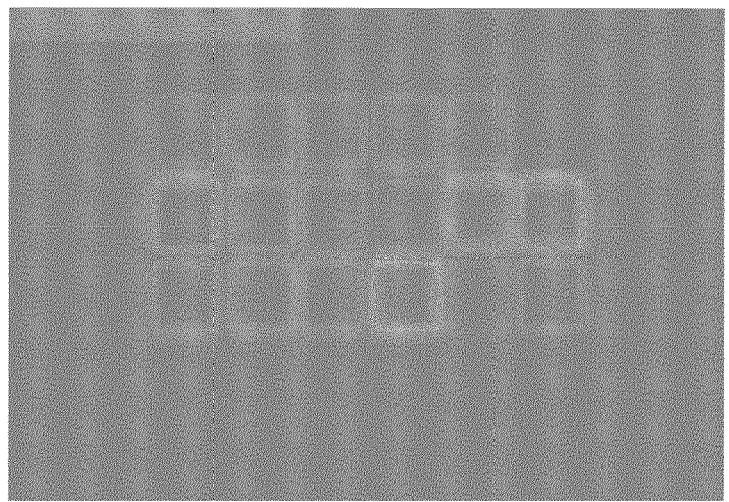
Figure 5:
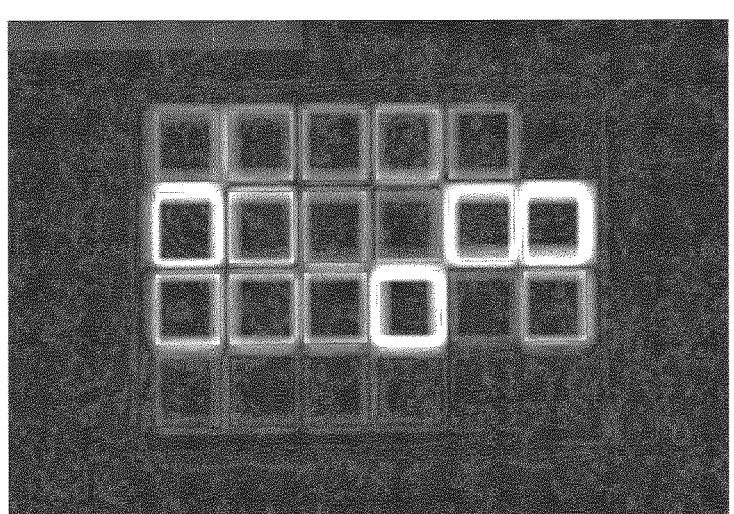

FIG. 5 illustrates an example of noise and edge detection resulting from the low pass filtering found in FIG. 1. The first FIG. 505 represents the input image with low frequency values removed from it. In other words, the first FIG. 505 represents the results of the wavelet decomposition for frequency level one. The second FIG. 510 represents the wavelet decomposition results for frequency level two. The third FIG. 515 represents the wavelet decomposition results for frequency level five. Each of the three images are captured using an uncalibrated sensor and are of a Macbeth ColorChecker chart 400.

Figure 6:
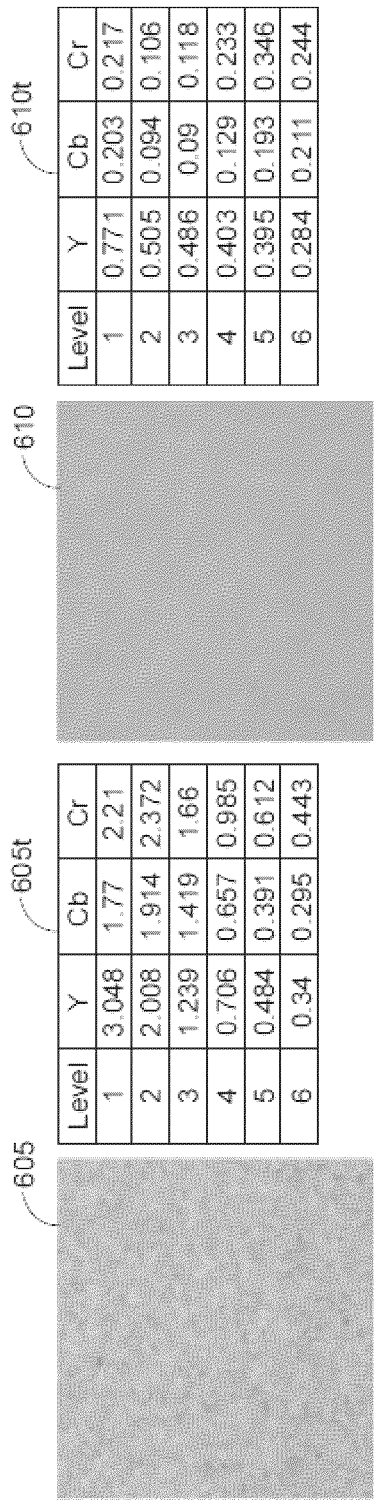
FIG. 6 illustrates two example images, one representing an input image prior to denoise, and the other representing an image after denoise. Noise values for the luminance and chrominance values for each image are provided in tables.

FIG. 6 illustrates an example set of images with corresponding Wavelet decomposition frequency levels and the luma and chroma values for each frequency level. The first image 605 a first table 605t corresponds to the first image 605. The first image 605 is a region of interest, or a section of a larger image captured of a MacBeth ColorChecker chart 400. The image is captured using an uncalibrated sensor. The image may be converted from an RGB to a YCbCr color space. The first table 605t shows six frequency levels, each frequency level having a row in a column labeled "Level." The frequency levels descend from frequency level 1 being the highest frequency, to frequency level 6 being the lowest frequency. The luma values corresponding to each level are shown in a column labeled "Y." The chroma values corresponding to each level are shown in two columns labeled "Cb" and "Cr." Cb and Cr are representative of the two chroma channels associated with the first image 605, and Y representative of the luma channel. Note that the Y values of each frequency level have significant value deltas between other frequency levels. The Cb and Cr values also have significant value deltas.

Still referring to FIG. 6, a second image 610 and a second table 610t that corresponds with the second image 610 illustrates a result of the same image sensor after the de-noise operation. The table shows six frequency levels, each frequency level having a row in a column labeled "Level." The luma values corresponding to each level are shown in a column labeled "Y." The chroma values corresponding to each level are shown in two columns labeled "Cb" and "Cr." Note that the texture of the first image 605 is more rough than the texture of the relatively smooth second image 610. Note that the luma and chroma values across the six frequency levels in the first table 605t have a greater variability relative to each other frequency level than the luma and chroma values in the second table 610t.

Figure 7:
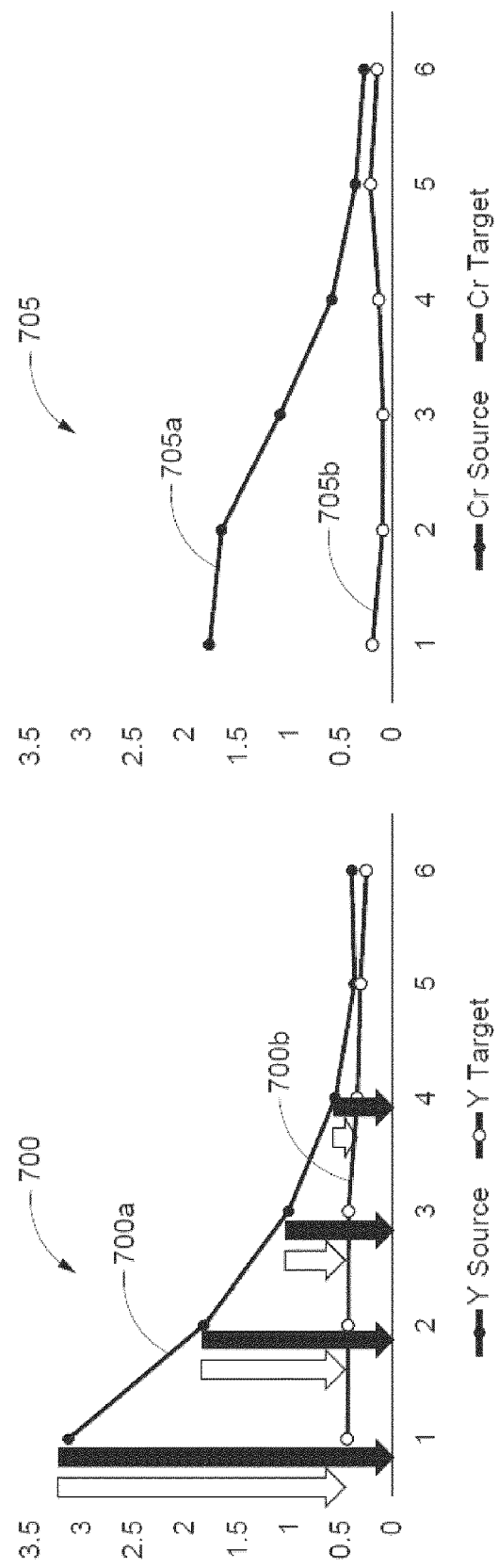
FIG. 7 illustrates two charts, one representing the luminance noise values associated with the input image and the reference image, the other chart representing the chrominance noise values associated with the input image and the reference image.

FIG. 7 illustrates the source and target noise profiles for an example image using the luma and chroma channel values. FIG. 7 includes two graphs. In both graphs, the y-axis represents a noise value, while the x-axis represents the six frequency levels. Both graphs illustrate the noise level differences between a source image and a target image. The first graph 700 has two lines. The first line is representative of the source image luma values for each of the six frequency values and is labeled "Y Source" 700a. The Y source 700a line represents the initial standard deviation values of the luma component of an image captured by an uncalibrated image sensor. The second line is representative of a target luma value for each frequency level, and is labeled "Y Target" 700b. The target value represents a target noise value for optimization of the source image, and may be generated from a reference image. Note the arrows indicating that the luma noise values of the source image need to be reduced to meet the target luma noise values. The search algorithm discussed further below may bring the Y source 700a values closer to the Y target 700b values. As noted above, frequency level 1 is the highest frequency level. As such, frequency level 1 will generally have the largest disparity between the source and target noise values.

With continued reference to FIG. 7, the second graph 705 has two lines. The first line is representative of first channel chroma values (Cr) for each of the six frequency values of the source image and is labeled "Cr Source" 705a. The second line is representative of a target chroma values for each frequency level, and is labeled "Y Target" 705b. The target values represent noise values for optimization of the source image at each frequency level. As noted above, frequency level 1 is the highest frequency level. As such, frequency level 1 may generally have the largest disparity between the source and target noise values. In the second graph 705, the difference between the source values and the target values are approximately even for frequency levels one and two.

With continued reference to FIG. 7, the two graphs 700, 705 provide a noise profile for a source image and a reference image. The noise profile is a standard deviation value of each wavelet high frequency component measured from a wavelet input buffer. The noise profile defines the overall strength of de-noise for each frequency level and for the luma and chroma channels. For example, the noise profile may be represented as equation (1) below (sigma represents standard deviation):

$$\frac{\sigma_{source} - \sigma_{target}}{Ave\ \sigma_{target}} \qquad (1)$$

Where:
- $\sigma_{source}$: standard deviation value of the source image at a particular frequency level,
- $\sigma_{target}$: standard deviation value of the target image at a particular frequency level,
- Ave $\sigma_{target}$: average of the standard deviation values across each of the frequency levels.

Figure 8:
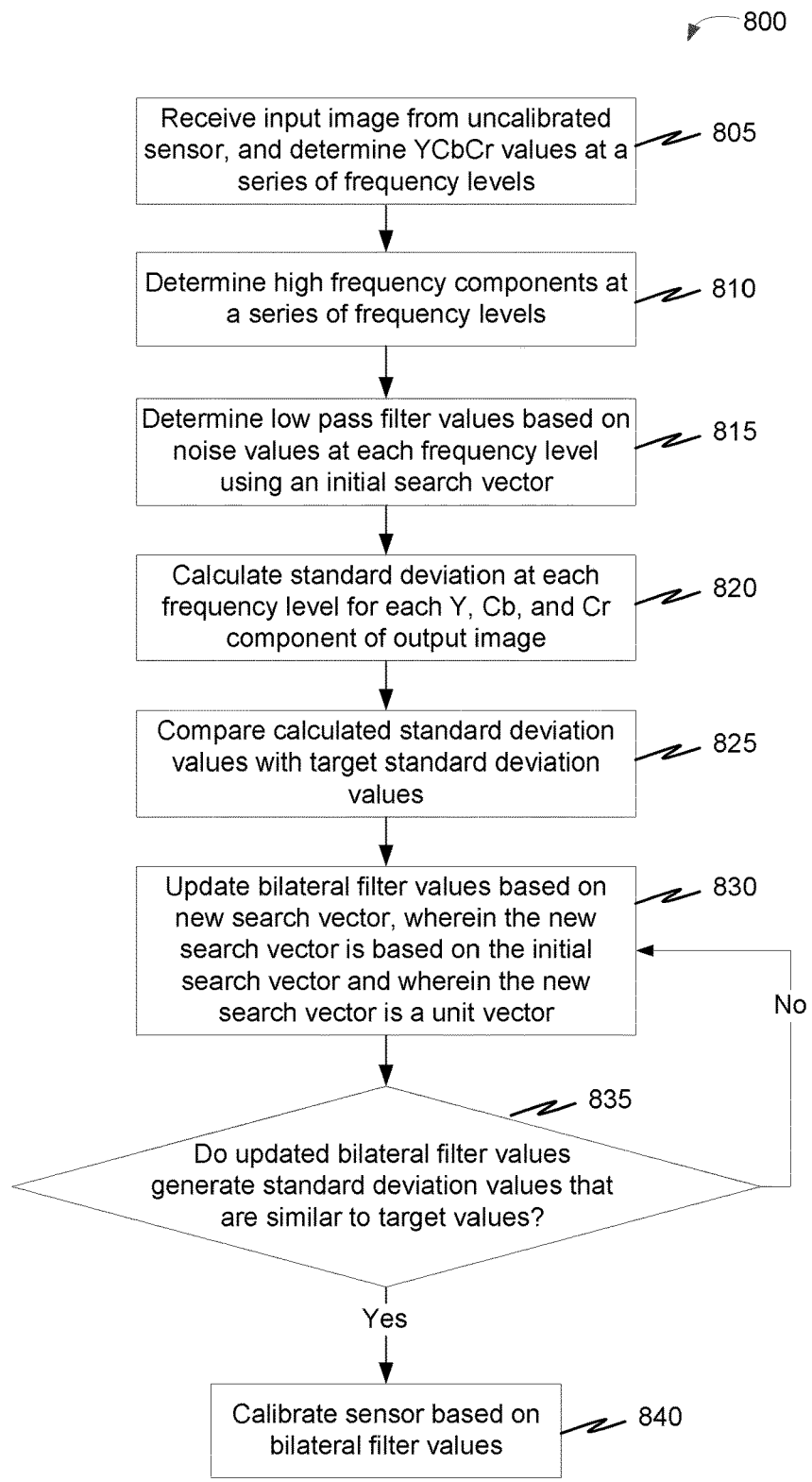
FIG. 8 is a flow chart that illustrates an example process for calibrating an image sensor.

FIG. 8 is a flowchart 800 illustrating a series of steps associated with certain aspects of the present disclosure. At block 805, the apparatus receives image data captured by an uncalibrated digital image sensor. In some aspects, the image data may be of a scene that includes the MacBeth ColorChecker chart 400. In other aspects, the image data may be of any other scene that matches a reference image. The image data may be in any color space, for example RGB, CMYK, L*a*b*, etc. As such, the image sensor may include a Bayer color filter array color pattern, or other arrangement of RGB, RGBW, and CYGM color filters. In one embodiment, the color filters may be different sizes relative to the pixel size. For example, a single pixel may have multiple color filters that overlay the photosensitive region or regions of the pixel. A processor may determine a luma component (Y), and a blue-difference (Cb) and red-difference (Cr) chroma components at each of a series of frequency levels. The series of frequency levels may correspond to a set of recursive noise levels that are subtracted from the input image. For example, a first noise level may be generated with a first low pass filter and subtracted from the input image. A second noise level may be generated by taking the first noise level and passing it through a second low pass filter. In another example, the frequency levels may be determined using a non-recursive function. For example, each frequency level may be correspond to a set of noise levels determined independent of each other using low pass filters that output frequencies according to a step function at each successive low pass filter.

At block 810, the apparatus may determine the high frequency component or the sigma value ($\sigma$) at each frequency level. The high frequency component for each frequency level may be determined using a series of low pass filters to filter a series of frequencies from the output image of FIG. 1. FIG. 3A illustrates how the high frequency component for each frequency level is determined.

At block 815, the apparatus may determine low pass filter values based on noise values at each frequency level using an initial search vector. The low pass filters of FIG. 1 may be dynamic low pass filters, the quotients of which can be modulated or changed. The initial search vector may be any four value vector. For example, an initial search vector for the coarse search algorithm may be {0.1, 0.1, 0.1, 0.1}. The search algorithm may use a pre-defined noise weight parameter during optimization. This value may, for example, be the system's default value. Another parameter, may be decided based on the final edge softness and histogram of the high frequency component of each frequency level. Overall denoise parameters may be optimized based on pure four-dimension edge softness parameters or vectors. A problem with current methods is the local minimum problem, where the final noise profile often results in large errors because the first level denoise influences all subsequent frequency levels. For example, the second, third, and fourth frequency levels are affected by the first level frequency denoise parameters. The search algorithm disclosed herein overcomes the local minimum issue.

In one embodiment, the coarse search algorithm may include equation (2):

$$\sum_{l=1}^{m} \frac{1}{n} \sum_{k=0}^{n} \sigma_{target,k,l} - \sum_{l=0}^{m} \frac{1}{n} \sum_{k=0}^{n} \sigma_{source,k,l,p} = 0 \quad (2)$$

Where:
- n: number of patches in the color checker chart (e.g., number of color regions in a Macbeth ColorChecker chart);
- m: number of Wavelet decomposition frequency levels;
- l: subject wavelet level (e.g., Wavelet decomposition frequency level 4);
- k: subject patch number (e.g., Macbeth ColorChecker chart patch 4);
- p: values of the four constants in the four-dimensional vector (e.g., {1, 1, 1, 1}, can be any number between 0 and infinity.

The vector values representing initial vector values for a coarse search may be arbitrary and user selectable. The resulting curve may be monotonical, as there is only one root.

At block 820, a standard deviation value is calculated at each frequency level for each of Y, Cb, and Cr component of the output image based on the determined low pass filter values. FIG. 1 illustrates this process. At block 825, a processor may compare the calculated standard deviation values with the target standard deviation values. The target standard deviation values may be determined from the target image or reference image. A difference between the calculated standard deviation values and the target standard deviation values may be calculated at each frequency level.

At block 830, the bilateral filter values may be updated based on a new search vector. The new search vector may be a unit vector. The new search vector is based on the initial search vector used in the coarse search, and is part of a fine search. The updated bilateral filter values may be based on the difference between the calculated standard deviation values and the target standard deviation values in the coarse search at each frequency level. The bilateral filter values may be updated several times. In such a case, a new search vector is used. Table 1 below illustrates the search vectors used for each frequency level in the fine search.

| Frequency Level | Search Vector | | | |
|---|---|---|---|---|
| 1 | 1 | 0 | 0 | 0 |
| 2 | 0 | 1 | 0 | 0 |
| 3 | 0 | 0 | 1 | 0 |
| 4 | 0 | 0 | 0 | 1 |

Table 1 illustrates an example set of search vectors for each frequency level, using a fine search. In this example, there are four frequency levels, numbered 1-4. The search vector associated with frequency level 1 is {1, 0, 0, 0}, the search vector associated with frequency level 2 is {0, 1, 0, 0}, the search vector associated with frequency level 3 is {0, 0, 1, 0}, and the search vector associated with frequency level 4 is {0, 0, 0, 1}. The fine search is a specialized search method for Wavelet denoise architecture. Unlike current methods, the fine search uses a separate target for each search vector, eliminating a local minimum limitation. For each search vector, equation (3) below defines the cost function to find p1, which is edge softness for 1 level, where equation (3) is equal to zero or a minimum value.

$$MSE\left(\frac{1}{n}\sum_{k=0}^{n}\sigma_{target,k,l}-\frac{1}{n}\sum_{k=0}^{n}\sigma_{source,k,pl}\right) \quad (3)$$

Where:
l: subject wavelet level (e.g., Wavelet decomposition frequency level 4);
k: subject patch number (e.g., Macbeth ColorChecker chart patch 4);
MSE: Mean Square Error.

When a first round of all four search vectors is completed, the cost function equation (4) below may be used as a stop condition, using the delta of all four frequency levels. Equation (4) may represent a fine search.

$$MSE\left(\sum_{l=0}^{m}\frac{1}{n}\sum_{k=0}^{n}\sigma_{target,k,l}-\sum_{l=0}^{m}\frac{1}{n}\sum_{k=0}^{n}\sigma_{source,k,pl,p_{0\sim m}}\right) \quad (4)$$

Where:
MSE: Mean Square Error.

Due to the nature of the wavelet de-noise, the above meets convergence criteria.

At block 835, the processor may determine whether the updated bilateral filters produce a standard deviation value, or high frequency component, that matches the target values of the reference image. The match criteria may be modified based on the image sensor being used or based on user configuration. For example, the image sensor may differ from the sensor used to capture the reference image by way of the color filter array configuration, size of pixels, number of pixels, or any other difference in image sensor configuration. The user may also determine that a match exists when the standard deviation difference between the source image and the target image at each frequency level is within 10%. This is an example only, as other percentage values may be used. In another embodiment, the user may set a matching tolerance for each frequency level. For example, the user may set a matching tolerance of 30% at the first frequency level, a matching tolerance of 20% at the second frequency level, a matching tolerance of 10% at the third frequency level, etc. In this case, a match exists when the standard deviation difference between the source image and the target image at each frequency level is within the range prescribed to each frequency level. This is an example only, as other percentage values may be used. If the matching criteria is not met, the fine search vectors may be reused with the most recently used bilateral filters. In another embodiment, the search vectors may be updated to new values.

At block 840, if it is determined that the matching criteria is met for all frequency levels, the sensor may be calibrated based on the bilateral filter values. The image sensor being calibrated will generally have several resources or "blocks" for adjusting image parameters related to the image sensor. For example, the image sensor may include a color/contrast block, a brightness block, a noise block, an offset block, a gamma block, etc. Each block may be calibrated using a look-up table that correlates the bilateral filter coefficient to a parameter value in the block. For example, a weak bilateral filter coefficient may filter a low amplitude ratio (e.g., −100 to −70 dB) while a strong bilateral filter coefficient may filter a high amplitude ratio (e.g., 70 to 100 dB). The look-table may include parameter values for each block, where each parameter value, or range of parameter values, are associated with specific bilateral filter coefficient, or range of bilateral filter coefficients.

Figure 9:
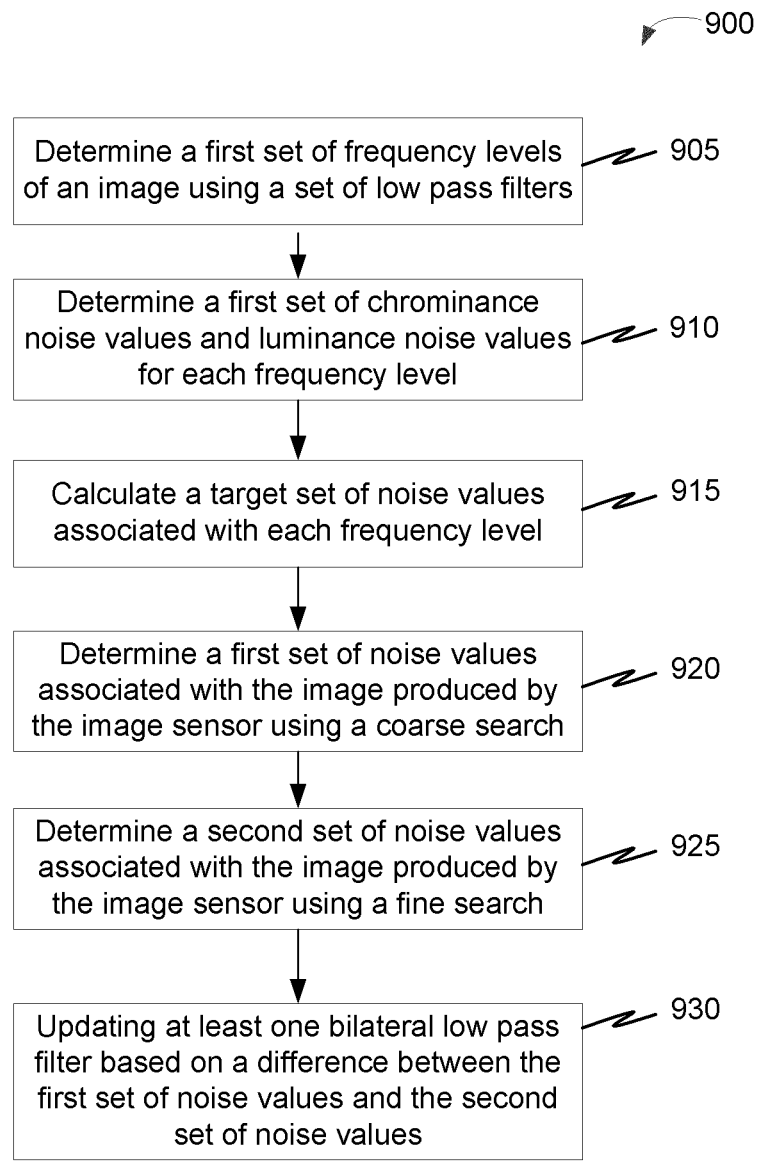
FIG. 9 is a flow chart that illustrates an example process for determining bilateral low pass filter values for image sensor calibration.

In one embodiment, the noise block of an image sensor may modulate a high-gain column or row amplifier for a column of pixels for increasing or decreasing the sensitivity of the pixels of that column or row. Another technique for adjusting noise levels of an image sensor may be by adjusting well capacity for each pixel of the image sensor, which modulates noise, leading to a modulated signal-to-noise ratio and/or a nonlinear sensor response. Still another technique for increasing FIG. 9 illustrates an example method 900 for calibrating an image sensor. In step 905, a processor may determine a first set of frequency levels of a source image using a set of low pass filters. The low pass filters may be fixed value low pass filters or a bilateral, dynamic low pass filter. In step 910, the processor may determine a first set of chrominance noise values and luminance noise values for each frequency level. The luminance and chrominance values may be determined using a histogram approach. In one approach, the chrominance and luminance values may be determined based on the color filter array (CFA) pattern of the image sensor being calibrated. Equation 5 below enables expression of the CFA pattern y[$\underline{n}$] in terms of the luminance component and chrominance components, $\underline{n}$=[$n_1$, $n_2$] where $\underline{n}$ represents an address to a spatial coordinate on an two-dimensional square lattice having a horizontal position ($n_1$) and a vertical position ($n_2$). Using the Bayer CFA pattern as an example, a data value at point n can be represented by the following equation:

$$y[\underline{n}]=l[\underline{n}]+((-1)^{n_1}-(-1)^{n_2})c_1[\underline{n}]+(-1)^{n_1+n_2}c_2[\underline{n}] \quad (5)$$

Where:
y[$\underline{n}$]: CFA data value at point $\underline{n}$=[$n_1$, $n_2$],
l[$\underline{n}$]: luminance value at point $\underline{n}$=[$n_1$, $n_2$],
$c_1$[$\underline{n}$]: chrominance value at point n=[$n_1$, $n_2$],
$c_2$[$\underline{n}$]: chrominance value at point n=[$n_1$, $n_2$].

In step 915, the processor calculates a target set of noise values associated with each frequency level. The target noise values may comprise a set of target chrominance and luminance noise values the sensor being calibrated is to be adjusted to match. The target noise values may be calculated based on the type of sensor being calibrated, the number of pixels, the CFA pattern, etc. The target set of noise values may also be determined by looking up known values in a memory component. The target set of noise values may also be determined by capturing an image using a calibrated image sensor and using the wavelet decomposition technique illustrated in FIG. 1 to calculate the target set of noise values.

In step 920, the processor may determine a first set of noise values associated with the image produced by the image sensor using a coarse search. The coarse search may be an arbitrary four dimensional vector of a region of an image captured by the uncalibrated sensor, or the sensor being calibrated. A search vector may be used for each of the luma and chroma channels. For example, the luma channel may use the following search vector: {0, 0.25, 0.5, 0.5} while the chroma channels may use the following vector: {0,0,0,0}. In another example, an initial search vector for the coarse search algorithm may be {0.1, 0.1, 0.1, 0.1} for each of the chroma and luma channels. The search algorithm may use a pre-defined noise weight parameter during optimization. This value may, for example, be the system's default value. In a situation that includes a bright light luma channel, using a search vector of {0,0,0,0} may provide more texture on a high frequency object. Similarly, for a low light luma channel, a search vector of {0, 0.25, 0.5, 0.5} because {0,0,0,0} may cause artifacts.

In step 925, the processor may determine a second set of noise values associate with the image produced by the image sensor using a fine search. The fine search may be used to bring the four vector values closer to matching the target noise values. As with the coarse search vectors, the fine search vectors may be used to generate a $\sigma$ value that matches the target $\sigma$ of each frequency level, and each channel.

In step 930, the processor may update the at least one bilateral low pass filter based on a difference between the first set of noise values and the second set of noise values. The bilateral low pass filters may be updated based on the $\sigma$ value associated with either of the coarse or fine search vectors using a look-up table. The bilateral filters may also be updated based on each of the frequency levels associated with the vector values for the luma and chroma channels.

Other Considerations

Implementations disclosed herein provide systems, methods and apparatus for submicron wafer alignment. One skilled in the art will recognize that these embodiments may be implemented in hardware, software, firmware, or any combination thereof.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute the instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for imaging, encoding, and/or decoding. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

As used herein, the term "plurality" denotes two or more. For example, a plurality of components indicates two or more components. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Headings are included herein for reference and to aid in locating various sections. These headings are not intended to limit the scope of the concepts described with respect thereto. Such concepts may have applicability throughout the entire specification.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method of tuning a noise level of an image sensor, the method comprising:
   applying at least one bilateral low pass filter to a signal from the image sensor to determine a set of frequency levels of an image;
   determining a target set of noise values for each frequency level of the set of frequency levels;
   determining a first set of noise values associated with the image based on denoising the signal;
   determining a second set of noise values associated with the image based on a difference between the target set of noise values and the first set of noise values;
   updating at least one coefficient of the at least one bilateral low pass filter based on a difference between the first and second sets of noise values; and
   adjusting the noise level of the image sensor via applying the at least one bilateral low pass filter with the updated coefficient.

2. The method of claim 1, wherein updating the at least one coefficient of the at least one bilateral low pass filter is continued until the difference between the second set of noise values and the first set of noise values is within a matching range.

3. The method of claim 2, wherein the matching range is different for each frequency level.

4. The method of claim 1, wherein the determination of the first and second set of noise values is based on a four-dimensional vector for each frequency level.

5. The method of claim 4, wherein the image is captured at the same distance from a color calibration target, the color calibration target comprising an arrangement of colored regions.

6. The method of claim 5, wherein the determining of the first set of noise values is based on standard deviation values of the image and standard deviation values of a target image for the set of frequency levels and a set of colored regions in the color calibration target.

7. The method of claim 6, wherein the determining of the second set of noise values is based on a mean square error of each of the standard deviation values of the image and the standard deviation values of the target image.

8. The method of claim 4, wherein the four-dimensional vector comprises four constants and each constant is a positive integer, and the adjusting of the noise level of the image sensor comprises updating a noise reduction block of the image sensor.

9. An apparatus for tuning a noise level of an image sensor, the apparatus comprising:
   an image sensor configured to produce an image;
   a processor configured to:
      determine a set of frequency levels of the image by applying at least one bilateral low pass filter to a signal from the image sensor;
      determine a target set of noise values for each frequency level of the set of frequency levels;
      determine a first set of noise values associated with the image based on denoising the signal;
      determine a second set of noise values associated with the image based on a difference between the target set of noise values and the first set of noise values;
      update at least one coefficient of the at least one bilateral low pass filter based on a difference between the second set of noise values and the first set of noise values; and
      adjust the noise level of the image sensor via applying the at least one bilateral low pass filter with the updated coefficient.

10. The apparatus of claim 9, wherein the processor is configured to update the at least one coefficient of the at least one bilateral low pass filter until the difference between the second set of noise values and the first set of noise values is within a matching range.

11. The apparatus of claim 10, wherein the matching range is different for each frequency level.

12. The apparatus of claim 9, wherein the determination of the first and second set of noise values is based on a four-dimensional vector for each frequency level.

13. The apparatus of claim 12, wherein the image is captured at the same distance from a color calibration target, the color calibration target comprising an arrangement of colored regions.

14. The apparatus of claim 13, wherein the determining of the first set of noise values is based on standard deviation values of the image and standard deviation values of a target image for the set of frequency levels and a set of colored regions in the color calibration target.

15. The apparatus of claim 14, wherein the determining of the second set of noise values is based on a mean square error of each of the standard deviation values of the image and the standard deviation values of the target image.

16. The apparatus of claim 15, wherein the four-dimensional vector comprises four constants and each constant is a positive integer, and the adjusting the noise level of the image sensor comprises updating a noise reduction block of the image sensor.

17. An apparatus, comprising:
   means for determining a set of frequency levels of an image by applying at least one bilateral low pass filter to a signal from an image sensor;
   means for determining a target set of noise values for each frequency level of the set of frequency levels;
   means for determining a first set of noise values associated with the image based on denoising the signal;

means for determining a second set of noise values associated with the image based on a difference between the target set of noise values and the first set of noise values;

means for updating at least one coefficient of the at least one bilateral low pass filter based on a difference between the second set of noises values and the first set of noise values; and means for adjusting a noise value of the image sensor via applying the at least one bilateral low pass filter with the updated coefficient.

18. The apparatus of claim 17, wherein the means for updating the at least one coefficient of the at least one bilateral low pass filter comprises means for updating the at least one bilateral low pass filter until the difference between the second set of noise values and the first set of noise values is within a matching range.

19. The apparatus of claim 18, wherein the matching range is different for each frequency level.

20. The apparatus of claim 17, wherein the determination of the first and second set of noise values is based on a four-dimensional vector for each frequency level.

21. The apparatus of claim 20, wherein the image is captured at the same distance from a color calibration target, the color calibration target comprising an arrangement of colored regions.

22. The apparatus of claim 21, wherein the means for determining the first set of noise values associated with the image is based on standard deviation values of the image and standard deviation values of a target image for the set of frequency levels and a set of colored regions in the color calibration target.

23. The apparatus of claim 22, wherein the means for determining the second set of noise values associated with the image is based on a mean square error of each of the standard deviation values of the image and the standard deviation values of the target image.

24. The apparatus of claim 23, wherein the four-dimensional vector comprises four constants and each constant is a positive integer, and the means for adjusting the noise level of the image sensor comprises means for updating a noise reduction block of the image sensor.

25. A non-transitory, computer-readable medium comprising instructions executable by a processor of an apparatus, that causes the apparatus to:

determine a set of frequency levels of an image by applying at least one bilateral low pass filter to a signal from an image sensor;

determine a target set of noise values for each frequency level of the set of frequency levels;

determine a first set of noise values associated with the image based on denoising the signal;

determine a second set of noise values associated with the image based on a difference between the target set of noise values and the first set of noise values;

update at least one coefficient of the at least one bilateral low pass filter based on a difference between the second set of noise values and the first set of noise values; and adjust a noise value of the image sensor via applying the at least one bilateral low pass filter with the updated coefficient.

26. The non-transitory computer-readable medium of claim 25, wherein the update of the at least one coefficient of the at least one bilateral low pass filter is continued until the difference between the second set of noise values and the first set of noise values is within a matching range.

27. The non-transitory computer-readable medium of claim 26, wherein the matching range is different for each frequency level.

28. The non-transitory computer-readable medium of claim 25, wherein the determination of the first and second set of noise values is based on a four-dimensional vector for each frequency level.

29. The non-transitory computer-readable medium of claim 28, wherein the image is captured at the same distance from a color calibration target, the color calibration target comprising an arrangement of colored regions.

* * * * *